United States Patent
Yamaguchi et al.

(10) Patent No.: US 10,486,471 B2
(45) Date of Patent: Nov. 26, 2019

(54) PNEUMATIC TIRE

(71) Applicant: The Yokohama Rubber Co., LTD., Minato-ku, Tokyo (JP)

(72) Inventors: Yukihito Yamaguchi, Hiratsuka (JP); Satoru Isobe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 588 days.

(21) Appl. No.: 14/900,052

(22) PCT Filed: Jun. 17, 2014

(86) PCT No.: PCT/JP2014/066066
§ 371 (c)(1),
(2) Date: Dec. 18, 2015

(87) PCT Pub. No.: WO2014/203908
PCT Pub. Date: Dec. 24, 2014

(65) Prior Publication Data
US 2016/0144662 A1    May 26, 2016

(30) Foreign Application Priority Data
Jun. 21, 2013  (JP) .................. 2013-130921

(51) Int. Cl.
*B60C 9/18*      (2006.01)
*B60C 9/20*      (2006.01)
(Continued)

(52) U.S. Cl.
CPC .......... *B60C 9/2006* (2013.01); *B60C 9/0007* (2013.01); *B60C 9/02* (2013.01);
(Continued)

(58) Field of Classification Search
CPC ......... B60C 9/18; B60C 9/1835; B60C 9/185; B60C 2009/1842; B60C 2009/1871;
(Continued)

(56) References Cited

U.S. PATENT DOCUMENTS 3,513,898 A * 5/1970 Lugli .................... B60C 9/2006
                                                          152/526
5,318,643 A   6/1994 Mizner et al.
5,327,954 A   7/1994 Nakamura

FOREIGN PATENT DOCUMENTS

JP   S49-0132705   12/1974
JP   H02-0147408    6/1990
(Continued)

OTHER PUBLICATIONS

International Search Report for International Application No. PCT/JP2014/066066 dated Aug. 19, 2014, 4 pages, Japan.

*Primary Examiner* — Justin R Fischer
(74) *Attorney, Agent, or Firm* — Thorpe North & Western (57) ABSTRACT

This pneumatic tire (1) includes: a pair of bead cores (11, 11); a carcass layer (13) extending between the pair of bead cores (11, 11); and a belt layer (14) including a laminate of at least four belt plies (141 to 144) having steel belt cords covered with coating rubber, the belt layer being disposed on the outer side in a tire radial direction of the carcass layer (13). An inter-cord distance (Ga) between an outermost layer belt ply (fourth belt (144)) and an adjacent belt ply (third belt (143)) has a relationship such that $0.80 \leq Ga/\varphi max \leq 1.80$ with respect to a maximum value ($\varphi max$) of outer diameters ($\varphi 4$, $\varphi 3$) of belt cords (1441, 1431) in the outermost layer belt ply (144) and the adjacent belt ply (143).

16 Claims, 5 Drawing Sheets

(51) Int. Cl.
*B60C 9/00* (2006.01)
*B60C 9/02* (2006.01)
*B60C 15/04* (2006.01)

(52) U.S. Cl.
CPC ...... *B60C 15/04* (2013.01); *B60C 2009/0071* (2013.01); *B60C 2009/1871* (2013.01); *B60C 2009/2016* (2013.01); *B60C 2009/2051* (2013.01); *B60C 2009/2064* (2013.01); *B60C 2009/2067* (2013.01); *B60C 2009/2077* (2013.01); *B60C 2009/2093* (2013.01); *B60C 2200/06* (2013.01)

(58) Field of Classification Search
CPC .... B60C 2009/2016; B60C 2009/2067; B60C 2009/2077
See application file for complete search history.

(56) References Cited

FOREIGN PATENT DOCUMENTS

| | | | |
|---|---|---|---|
| JP | H03-0279432 | | 12/1991 |
| JP | 4-46805 | * | 2/1992 |
| JP | H05-063904 | | 8/1993 |
| JP | H05-0319014 | | 12/1993 |
| JP | H08-142607 | | 6/1996 |
| JP | 3064108 | | 7/2000 |
| JP | 2001-113914 | | 4/2001 |
| JP | 2005-313837 | * | 11/2005 |
| JP | 2007-062428 | | 3/2007 |
| RU | 2 467 884 | | 11/2012 |
| RU | 122 611 | | 12/2012 |

* cited by examiner

| | CONVENTIONAL EXAMPLE | COMPARATIVE EXAMPLE | WORKING EXAMPLE 1 | WORKING EXAMPLE 2 | WORKING EXAMPLE 3 | WORKING EXAMPLE 4 | WORKING EXAMPLE 5 |
|---|---|---|---|---|---|---|---|
| Ga/φmax | 0.40 | 1.85 | 1.00 | 1.30 | 1.70 | 1.30 | 1.30 |
| SHOCK ABSORBING RUBBER | No | Yes | Yes | Yes | Yes | Yes | Yes |
| RELATIONSHIP BETWEEN MODULI MD, MB OF SHOCK ABSORBING RUBBER AND FOURTH BELT | — | Md = Mb | Md = Mb | Md = Mb | Md = Mb | Md < Mb | Md < Mb |
| BELT ANGLE DIFFERENCE BETWEEN FOURTH BELT AND THIRD BELT [deg] | 0 | 0 | 0 | 0 | 0 | 0 | 3 |
| DURABILITY PERFORMANCE | 100 | 102 | 110 | 115 | 113 | 120 | 125 |

FIG. 7

PNEUMATIC TIRE

TECHNICAL FIELD

The present technology relates to a pneumatic tire, and in particular to a pneumatic tire with improved durability performance.

BACKGROUND

Radial tires for construction vehicles are generally used for an extended period of time under heavy load and poor road conditions, and thus require high durability performance. In particular, suppressing the occurrence of separation (belt-edge separation) of an edge portion of a belt ply is in high demand.

The technology described in Japanese Patent No. 3064108B is a conventional radial tire for construction vehicles.

SUMMARY

The present technology provides a pneumatic tire with improved durability performance.

A pneumatic tire according to the present technology includes: a pair of bead cores; a carcass layer extending between the pair of bead cores; and a belt layer including a laminate of at least four belt plies having steel belt cords covered with coating rubber, the belt layer being disposed on the outer side in a tire radial direction of the carcass layer. In such a pneumatic tire, when the belt ply disposed on the outermost side in the tire radial direction is designated as an outermost layer belt ply, and the belt ply disposed on the inner side in the tire radial direction of the outermost layer belt ply is designated as an adjacent belt ply, an inter-cord distance Ga between the outermost layer belt ply and the adjacent belt ply having a relationship such that $0.80 \leq Ga/\varphi max \leq 1.80$ with respect to a maximum value $\varphi max$ of outer diameters of the belt cords in the outermost layer belt ply and the adjacent belt ply.

In the pneumatic tire according to the present technology, the inter-cord distance Ga between the outermost layer belt ply and the adjacent belt ply is appropriately adjusted, thereby decreasing a strain that occurs between these belt plies during a tire rolling motion. This results in the advantage that the occurrence of separation is suppressed and tire durability performance is improved.

DETAILED DESCRIPTION

Hereinafter, the present technology will be described in detail with reference to the drawings. It should be noted that the present technology is not limited to the following embodiment. In addition, the constituents of the embodiment include those replaceable and obviously replaced while maintaining the identity of the technology. Moreover, a plurality of modified examples described in the embodiment may be combined together as desired as far as they are obvious for those skilled in the art.

[Pneumatic Tire]

Figure 1:
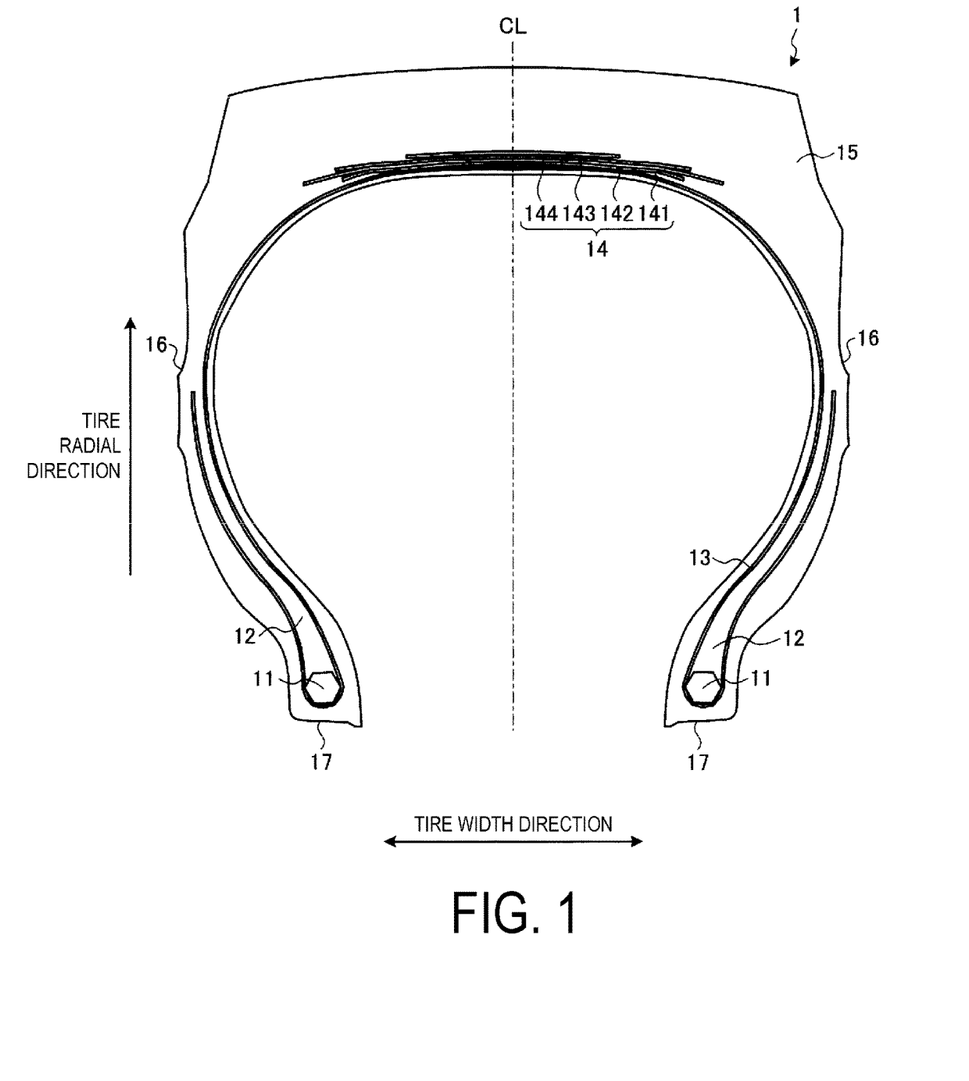
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. FIG. 1 illustrates a one-sided region of the cross-sectional view in a tire radial direction. Further, FIG. 1 illustrates a radial tire for construction vehicles called an off-the-road (OR) tire as an example of the pneumatic tire.

It should be noted that, in FIG. 1, a cross section in the tire meridian direction refers to a cross section when the tire is cut along a plane that includes a tire rotational axis (not illustrated). Further, a symbol CL corresponds to a tire equatorial plane and refers to a plane orthogonal to a tire radial direction that passes through a center point of the tire in the tire rotational axis direction. Further, a tire width direction refers to a direction parallel to the tire rotational axis, and the tire radial direction refers to a direction orthogonal to the tire rotational axis.

A pneumatic tire 1 includes a pair of bead cores 11, 11 having annular structures that center around a tire rotational axis, a pair of bead fillers 12, 12, a carcass layer 13, a belt layer 14, a tread rubber 15, a pair of side wall rubbers 16, 16, and a pair of rim cushion rubbers 17, 17 (refer to FIG. 1). It should be noted that boundaries between the bead fillers 12, the tread rubber 15, the sidewall rubbers 16, and the rim cushion rubbers 17 are not illustrated.

The pair of bead cores 11, 11 are annular members formed by bundling a plurality of bead wires, and constitute cores of left and right bead portions. The pair of bead fillers 12, 12 are disposed on outer peripheries in the tire radial direction of the pair of bead cores 11, 11 so as to reinforce the bead portions.

The carcass layer 13 extends between the left and right bead cores 11, 11 in toroidal form, forming a framework for the tire. Additionally, both edge portions of the carcass layer 13 are folded from an inner side toward an outer side in the tire width direction so as to envelop the bead cores 11 and the bead fillers 12, and fixed. Further, the carcass layer 13 is constituted by a plurality of carcass cords formed of steel, covered by coating rubber, and subjected to a rolling process. The carcass layer 13 has a carcass angle (an angle of inclination of the direction of the fibers of the carcass cord with respect to a tire circumferential direction), as an absolute value, of not less than 85 deg and not greater than 95 deg.

The belt layer 14 includes a laminate of at least four belt plies 141 to 144, and is disposed so as to extend over an outer periphery of the carcass layer 13. Generally, in an OR tire, four to eight belt plies are laminated to form the belt layer 14 (not illustrated). The structure of the belt layer 14 will be described later.

The tread rubber 15 is disposed on the outer periphery in the tire radial direction of the carcass layer 13 and the belt layer 14, and forms a tread portion of the tire. The pair of side wall rubbers 16, 16 are disposed on each outer side in the tire width direction of the carcass layer 13 so as to form left and right side wall portions. The pair of rim cushion rubbers 17, 17 are disposed on each inner side in the tire radial direction of the folded portion of the left and right bead cores 11, 11 and the carcass layer 13 so as to form a contact surface of the left and right bead portions with respect to a rim flange.

[Belt Layer]

Figure 2:
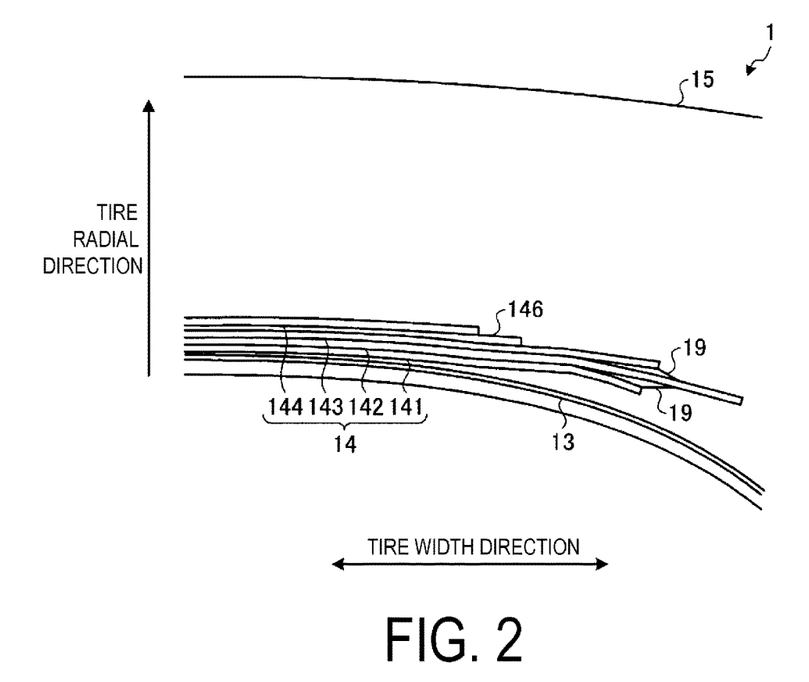
FIG. 2 is an explanatory view illustrating a belt layer of the pneumatic tire illustrated in FIG. 1.
Figure 3:
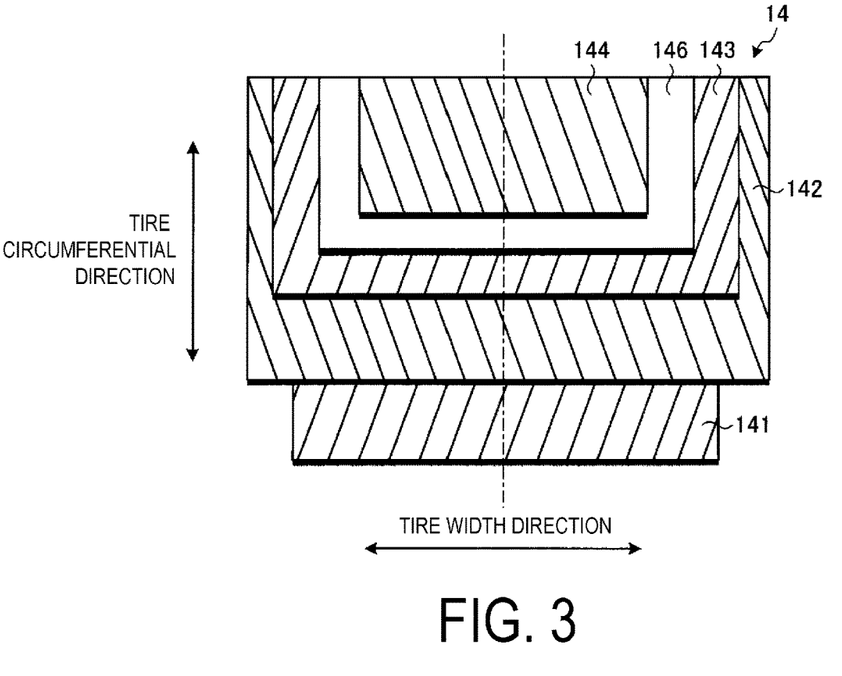
FIG. 3 is an explanatory view illustrating the belt layer of the pneumatic tire illustrated in FIG. 1.

FIGS. 2 and 3 are explanatory views illustrating the belt layer of the pneumatic tire depicted in FIG. 1. In these figures, FIG. 2 illustrates an enlarged view of an edge region of the belt layer 14, and FIG. 3 illustrates a laminated structure of the belt layer 14. In FIG. 3, the hatching depicted in each of the belt plies 141 to 144 schematically illustrates the disposition structure of the belt cords.

In the configuration in FIG. 1, as illustrated in FIGS. 2 and 3, the belt layer 14 is formed of the four laminated belt plies 141 to 144, and is disposed so as to extend over the outer periphery of the carcass layer 13. Here, these belt plies 141 to 144 are referred to as a first belt 141, a second belt 142, a third belt 143, and a fourth belt 144, in the order from the inner side in the tire radial direction.

Further, the belt ply disposed on the outermost side in the tire radial direction is referred to as the outermost layer belt ply, and the adjacent belt ply disposed on the inner side in the tire radial direction with respect to the outermost layer belt ply is referred to as the adjacent belt ply. In the configuration in FIG. 1, the fourth belt 144 is the outermost layer belt ply, and the third belt 143 is the adjacent belt ply.

Each of the belt plies 141 to 144 is a member formed by steel cords being covered with coating rubber and subjected to a rolling process (refer to FIG. 3).

A belt angle of the outermost layer belt ply 144 is preferably smallest among all of the belt angles of the belt plies 141 to 144. At this time, the belt angle of the outermost layer belt ply 144 and the belt angle of any one of the other belt plies may be the same. Further, the belt angle, as an absolute value, of the outermost layer belt ply 144 is preferably in a range of not less than 16 deg and not greater than 20 deg.

Further, a difference between absolute values of the belt angle of the outermost layer belt ply 144 and the belt angle of the adjacent belt ply 143 is preferably not less than 3 deg. As illustrated in FIG. 3, each of the belt plies 141 to 144 has a belt angle of a different sign with respect to the adjacent belt ply. The belt plies are laminated so that the inclination directions of the belt cords are horizontally inverted in an alternate manner. Accordingly, a crossply structure is formed, increasing the structural strength of the belt layer 14.

It should be noted that, in a radial tire for construction vehicles, an outer diameter φ of the belt cords of the belt plies 141 to 144 is in a range of 1.50 mm≤φ≤6.00 mm. At this time, the belt cords of each of the belt plies 141 to 144 may have the same outer diameters φ or outer diameters φ that differ from each other.

When the belt cord is formed of a plurality of cords twisted together, the outer diameter of the belt cord is measured as the diameter of a circle that circumscribes the belt cord in a cross-sectional view in the radial direction.

Further, in the radial tire for construction vehicles, a breaking elongation E of the belt cords of the belt plies 141 to 144 is in a range of 270%≤E≤410%.

The breaking elongation is measured by performing a tensile test conforming to JIS-K7161 using a tensile tester (INSTRON 5585H manufactured by Instron Corp.) at a pulling speed of 2 mm/min.

Further, in the radial tire for construction vehicles, a modulus Mb at 100% elongation of the coating rubber of the belt plies 141 to 144 is in a range of 3.0 MPa≤Mb≤4.5 MPa.

The modulus is measured by a tensile test at room temperature in accordance with JIS-K6251 (using No. 3 dumbbells).

Further, in the configuration in FIG. 3, the second belt 142 has the widest structure, and the fourth belt 144 that is the outermost layer belt ply has the narrowest structure. Therefore, the first belt 141 has a structure that is narrower than that of the second belt 142. Further, the third belt 143 has a structure that is narrower than that of the second belt 142 and wider than that of the fourth belt 144.

Further, belt edge cushions 19, 19 are respectively inserted between the left and right edge portions of the first belt 141 and the second belt 142, and the left and right edge portions of the third belt 143 and the second belt 142. Accordingly, the edge portion of the first belt 141 and the edge portion of the third belt 143 are disposed so as to be separated from the second belt 142. Further, a modulus Mc of the belt edge cushion 19 preferably has a relationship such that Mc≤Mb and, more preferably, Mc≤Mb with respect to the modulus Mb of the coating rubber of the adjacent belt ply. Accordingly, a stress concentration on the edge portion of the belt ply is alleviated and the occurrence of the separation is suppressed.

[Inter-cord Distance of Belt Plies]

Figure 4:
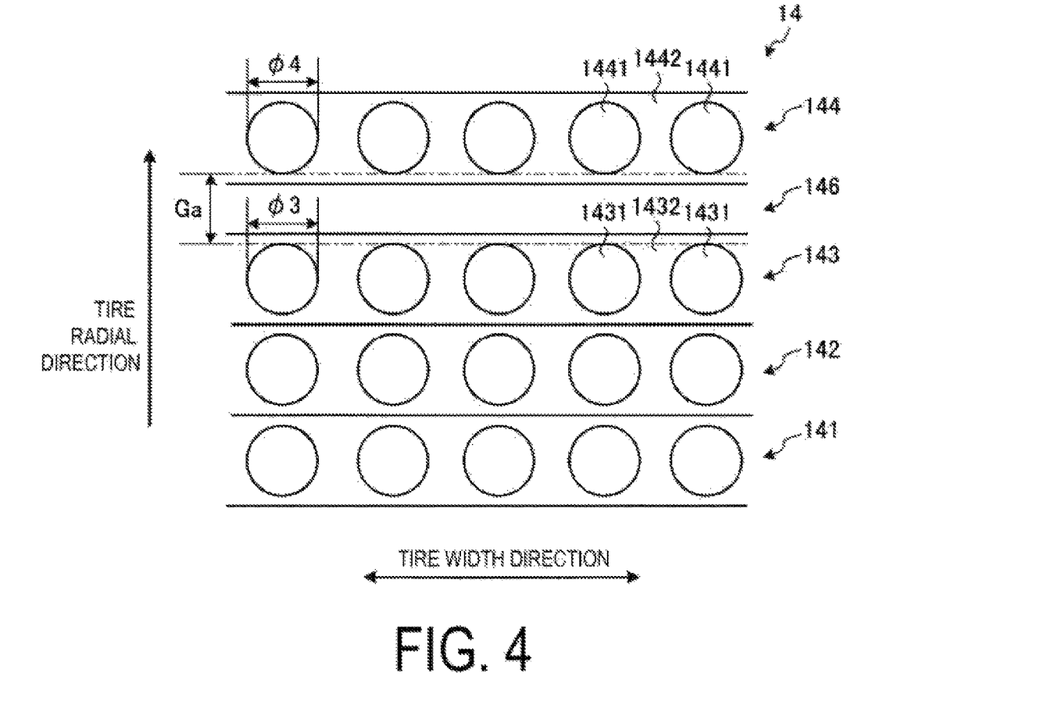
FIG. 4 is an explanatory view illustrating the belt layer of the pneumatic tire illustrated in FIG. 1.

FIG. 4 is an explanatory view illustrating the belt layer of the pneumatic tire depicted in FIG. 1. FIG. 4 schematically illustrates the disposition structure of the belt cords and coating rubber that constitute each of the belt plies 141 to 144.

Radial tires for construction vehicles are generally used for an extended period of time under heavy load and poor road conditions, and thus require high durability performance. In particular, suppressing the occurrence of separation (belt-edge-separation) of an edge portion of a belt ply is in high demand.

Hence, this pneumatic tire 1 includes the following bead structure to improve durability performance (refer to FIG. 4.).

First, in the configuration in FIG. 4, an inter-cord distance Ga between the fourth belt 144, which is the outermost layer belt ply, and the third belt 143, which is the adjacent belt ply, is defined.

The inter-cord distance is a thickness of a rubber material between belt cords of adjacent belt plies, and is measured with the tire mounted on a specified rim and inflated to the specified internal pressure under no load. Specifically, the tire itself is applied and fixed with tape or the like to an imaginary line of the tire profile measured by a laser profiler, for example. Next, for the adjacent belt plies to be measured, the distance in the tire radial direction between an upper edge position of the belt cord of the belt ply located on the inner side in the tire radial direction and a lower edge position of the belt cord of the belt ply located on the outer side in the tire radial direction is measured using a caliper or the like, and the value is taken to be the inter-cord distance. The laser profiler used here is a tire profile measuring device (manufactured by Matsuo Co., Ltd.).

The specified rim refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). The specified internal pressure refers to a "maximum air pressure" defined by JATMA, a maximum value in "tire load limits at various cold inflation pressures" defined by TRA, or "inflation pressures" defined by ETRTO. A specified load refers to a "maximum load capacity" defined by JATMA, a maximum value in "tire load limits at various cold inflation pressures" defined by TRA, or a "load capacity" defined by ETRTO. However, with JATMA, in the case of passenger car tires, the specified internal pressure is an air pressure of 180 kPa, and the specified load is 88% of the maximum load capacity.

Further, the maximum value φmax of the outer diameters of the belt cords of the outermost layer belt ply and the adjacent belt ply is defined. Accordingly, in the configuration in FIG. 4, an outer diameter φ4 of a belt cord 1441 of the fourth belt 144 and an outer diameter φ3 of a belt cord 1431 of the third belt 143 are compared, and the larger of the two is selected as the maximum value φmax.

At this time, the inter-cord distance Ga between the outermost layer belt ply 144 and the adjacent belt ply 143 and the maximum value φmax of the outer diameters of the belt cords has the relationship such that 0.80≤Ga/φmax≤1.80. Further the ratio Ga/φmax is in a range of 1.30≤Ga/φmax≤1.80.

Further, the ratio between the inter-cord distance (not illustrated) between another set of adjacent belt plies 141, 142 (142, 143) and the maximum value of the outer diameters of the belt cords of the pair of belt plies 141, 142 (142, 143) that form this inter-cord distance is preferably in a range of not less than 0.3 and not greater than 0.7. Accordingly, the ratio between the inter-cord distance between adjacent belt plies and the maximum value of the outer diameters of the belt cords is set largest between the outermost layer belt ply 144 and the adjacent belt ply 143.

In the above-described configuration, the inter-cord distance Ga between the outermost layer belt ply 144 and the adjacent belt ply 143 is appropriately adjusted, thereby decreasing the strain that occurs between these belt plies during a tire rolling motion. As a result, the occurrence of separation is suppressed.

It should be noted that, in the configuration in FIG. 1, as illustrated in FIG. 2 and FIG. 4, the inter-cord distance Ga between the outermost layer belt ply 144 and the adjacent belt ply 143 is substantially constant in the disposed region of the outermost layer belt ply 144. Therefore, in the overall disposed region of the outermost layer belt ply 144, the ratio Ga/φmax is set to the above-described range.

However, the inter-cord distance Ga between the outermost layer belt ply 144 and the adjacent belt ply 143 and the ratio Ga/φmax are not limited to the above, and may be set to the above described ranges at at least both edge portions of the outermost layer belt ply 144. Accordingly, separation of the edge portion of the outermost layer belt ply 144, which is particularly susceptible to separation, can be effectively suppressed.

[Shock Absorbing Rubber]

In this pneumatic tire 1, as illustrated in FIGS. 2 to 4, the belt layer 14 includes a shock absorbing rubber 146. This shock absorbing rubber 146 is a member that is disposed between the outermost layer belt ply 144 and the adjacent belt ply 143 and adjusts the inter-cord distance Ga.

Further, in the above-described configuration, a modulus Md of the shock absorbing rubber 146 preferably has a relationship such that Md≤Mb and, more preferably, Md<Mb with respect to the modulus Mb of a coating rubber 1442 of the outermost layer belt ply 144. Further, the modulus Md of the shock absorbing rubber 146 is preferably in a range of 3.0 MPa≤Md≤4.0 MPa.

Further a gauge Ga' (not illustrated) of the shock absorbing rubber 146 preferably has a relationship such that 0.45≤Ga'/φmax≤1.00 with respect to the maximum value φmax of the outer diameters of the belt cords of the outermost layer belt ply 144 and the adjacent belt ply 143.

For example, in the configuration in FIGS. 2 to 4, the shock absorbing rubber 146 is wider than the outermost layer belt ply 144 and narrower than the adjacent belt ply 143, and is disposed across the entire region of the outermost layer belt ply 144. Further, the shock absorbing rubber 146 has a single structure and has a uniform gauge Ga'.

[Modified Example]

Figure 5:
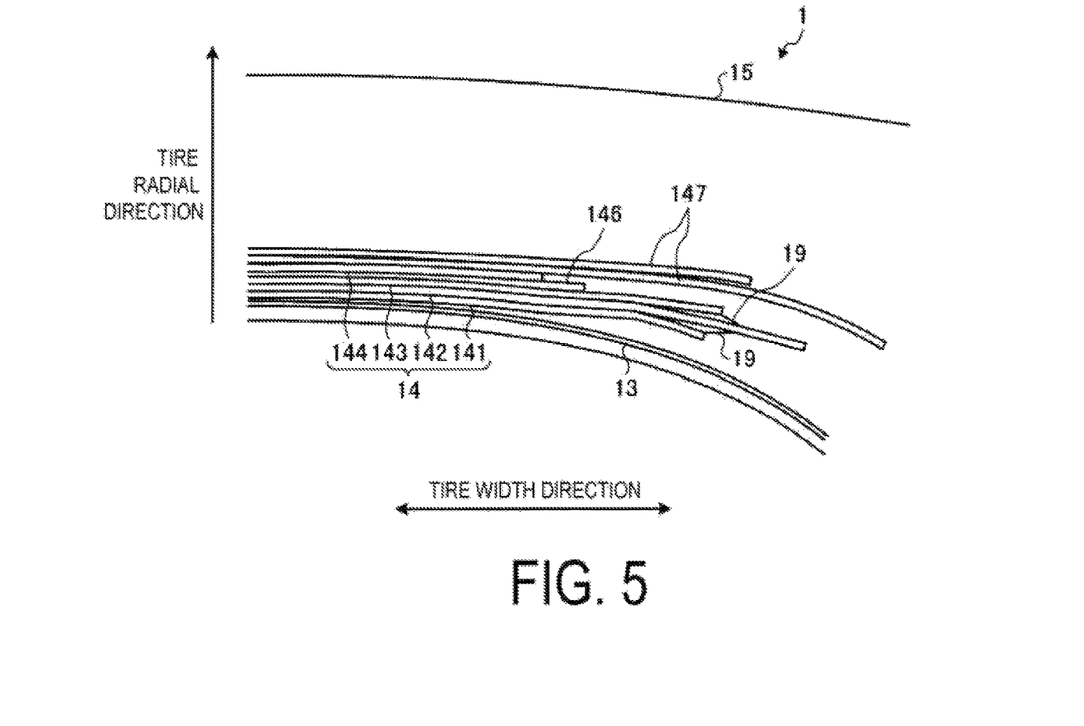
FIG. 5 is an explanatory view illustrating a modified example of the pneumatic tire illustrated in FIG. 1.
Figure 6:
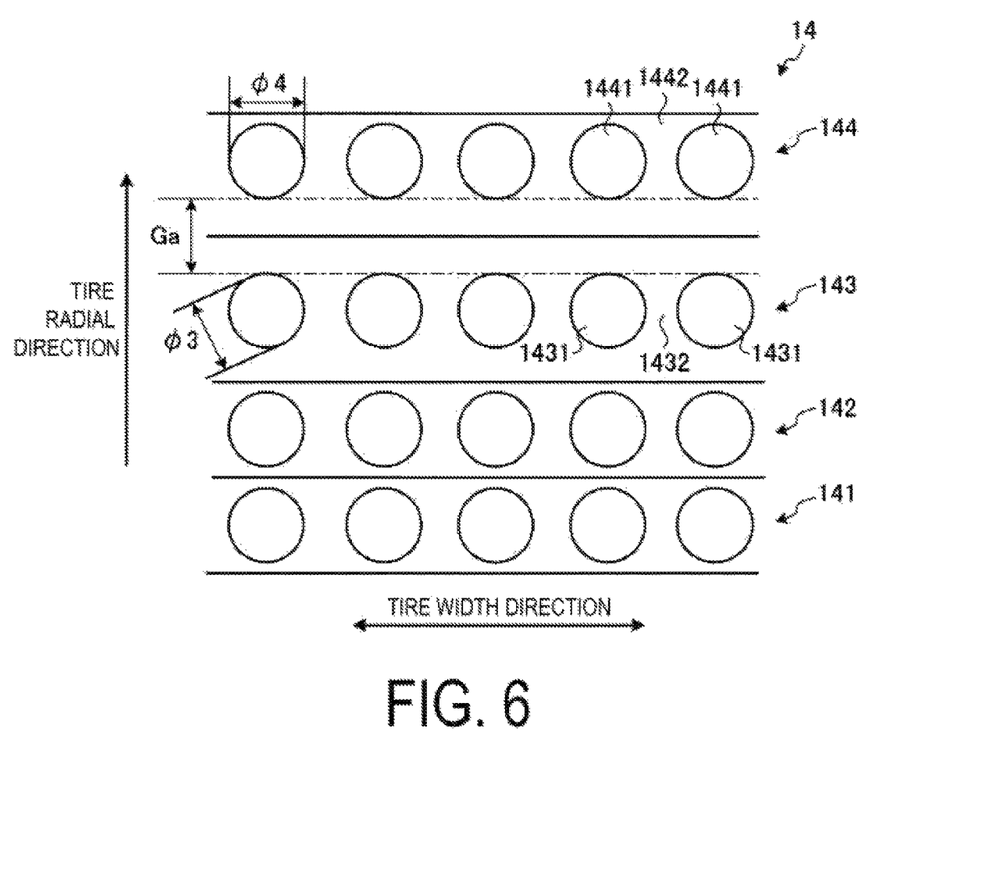
FIG. 6 is an explanatory view illustrating the modified example of the pneumatic tire illustrated in FIG. 1.

FIGS. 5 and 6 are explanatory views illustrating a modified example of the pneumatic tire depicted in FIG. 1. FIG. 5 illustrates an enlarged view of the edge region of the belt layer 14. FIG. 6 schematically illustrates the disposition structure of the belt cords and coating rubber that constitute each of the belt plies 141 to 144.

In this pneumatic tire 1, as illustrated in FIG. 5, the belt layer 14 may have a protective layer 147.

This protective layer 147 is disposed so as to cover the outer side in the tire radial direction of the outermost layer belt ply 144, and protects the other belt plies 141 to 144. Further, the protective layer 147 is formed by steel cords being covered by a coating rubber and subjected to a rolling process. The protective layer 147, as illustrated in FIG. 5, is disposed so as to cover the entire region of the belt widths of the other belt plies 141 to 144 that constitute a strengthening member. Further, the protective layer 147, compared to the other belt plies 141 to 144, differs in that the protective layer 147 is a belt ply made of steel cords having a breaking elongation of no less than 3%.

Further, in the configuration in FIGS. 2 to 4, as described above, the belt layer 14 includes the shock absorbing rubber 146 that is disposed between the outermost layer belt ply 144 and the adjacent belt ply 143 and adjusts the inter-cord distance Ga. Such a configuration allows the inter-cord distance Ga to be easily adjustable, and is therefore preferred.

However, the present technology is not limited to the above, allowing the shock absorbing rubber 146 to be omitted and the inter-cord distance Ga to be adjusted by increasing the gauge of the coating rubbers 1442, 1432 of the belt plies 144, 143, as illustrated in FIG. 6.

[Effect]

As described above, the pneumatic tire 1 includes the pair of bead cores 11, 11, the carcass layer 13 extending between the pair of bead cores 11, 11, and the belt layer 14 including a laminate of at least four belt plies 141 to 144 having steel belt cords covered with coating rubber, the belt layer 14 being disposed on the outer side in the tire radial direction of the carcass layer 13 (refer to FIGS. 1 to 3). Further, the inter-cord distance Ga between the outermost layer belt ply (the fourth belt 144) and the adjacent belt ply (the third belt 143) has the relationship such that 0.80≤Ga/φmax≤1.80 with respect to the maximum value φmax of the outer diameters φ3, φ4 of the belt cords 1431, 1441 in the outermost layer belt ply 144 and the adjacent belt ply 143 (refer to FIG. 4).

In such a configuration, the inter-cord distance Ga between the outermost layer belt ply 144 and the adjacent belt ply 143 is appropriately adjusted, thereby decreasing the strain that occurs between these belt plies 144, 143 during a tire rolling motion. As a result, the advantage of suppressing the occurrence of separation and improving tire durability performance is achieved. That is, because of the relationship such that 0.80≤Ga/φmax, the inter-cord distance Ga in the outermost layer belt ply 144 is suitably maintained. Further, because of the relationship such that Ga/φmax≤1.80, a hoop effect by the outermost layer belt ply 144 is suitably maintained and the strain between the other belt plies 141 to 143 is suppressed. Accordingly, the occurrence of separation is effectively suppressed.

Further, according to the pneumatic tire 1, the maximum value φmax of the outer diameters φ4, φ3 of the belt cords 1441, 1431 is preferably in the range of 1.50 mm≤φmax≤6.00, and more preferably in a range of 1.55 mm≤φmax≤φ5.00 mm (refer to FIG. 4). Accordingly, there is the advantage that the outer diameters φ4, φ3 of the belt cords 1441, 1431 are appropriately adjusted.

Further, according to the pneumatic tire 1, the modulus Mb at 100% elongation of the coating rubber 1442 of the outermost layer belt ply 144 is preferably in the range of 3.0 MPa≤Mb≤4.5 MPa, and more preferably in a range of 3.3 MPa≤Mb≤4.3 MPa. Accordingly, there is the advantage that the modulus Mb of the coating rubber 1442 is appropriately adjusted.

Further, according to the pneumatic tire 1, the breaking elongation E of the belt cord 1441 of the outermost layer belt ply 144 is preferably in the range of 270%≤E≤410%, and more preferably in a range of 290%≤E≤390%. Accordingly, there is the advantage that the breaking elongation E of the belt cord 1441 is appropriately adjusted.

Further, according to the pneumatic tire 1, a belt angle α4 (not illustrated) of the outermost layer belt ply 144 among all belt angles α of the belt plies 141 to 144 is solely smallest. Therefore, the outermost layer belt has the lowest angle, and there is no belt having the same angle. Accordingly, there is the advantage that the hoop effect by the outermost layer belt ply 144 is effectively achieved.

Further, according to the pneumatic tire 1, the belt angle α4, as an absolute value, of the outermost layer belt ply 144, is in the range of not less than 16 deg and not greater than 20 deg. Accordingly, there is the advantage that the belt angle α4 of the outermost layer belt ply 144 is appropriately adjusted. That is, because the belt angle α4 is no greater than 20 deg, the strength of the outermost layer belt ply 144 is suitably maintained.

Further, according to the pneumatic tire 1, the outermost layer belt ply 144 and the adjacent belt ply 143 have the belt angles α4 and α3 (not illustrated) having mutually different signs (refer to FIG. 3). Accordingly, a crossply structure is formed, resulting in the advantage that the strength of the belt layer 14 is improved.

Further, the pneumatic tire 1 further includes the shock absorbing rubber 146 that is disposed between the outermost layer belt ply 144 and the adjacent belt ply 143 and adjusts the inter-cord distance Ga (refer to FIGS. 2 to 4). Accordingly, there is the advantage that the inter-cord distance Ga can be easily adjusted.

Further, according to the pneumatic tire 1, the modulus Md at 100% elongation of the shock absorbing rubber 146 has the relationship such that Md<Mb with respect to the modulus Mb at 100% elongation of the coating rubber 1442 of the outermost layer belt ply 144. Accordingly, there is the advantage that the strain acting between the outermost layer belt ply 144 and the adjacent belt ply 143 is effectively reduced.

Further, according to the pneumatic tire 1, the gauge Ga' of the shock absorbing rubber 146 has the relationship such that 0.45≤Ga'/φmax≤1.00 with respect to the maximum value φmax of the outer diameters φ4, φ3 of the belt cords 1441, 1431 of the outermost layer belt ply 144 and the adjacent belt ply 143. Accordingly, there is the advantage that the gauge Ga' of the shock absorbing rubber 146 is appropriately adjusted.

Further, according to the pneumatic tire 1, the difference between the absolute values of the belt angle α4 of the outermost layer belt ply 144 and the belt angle α3 of the adjacent belt ply 143 is no less than 3 deg. Accordingly, there is the advantage that the relationship between the belt angle α4 of the outermost layer belt ply 144 and the belt angle α3 of the adjacent belt ply 143 is appropriately adjusted.

Further, according to the pneumatic tire 1, the absolute value |α| of the belt angles α of all belt plies 141 to 144 is in a range of 16 deg≤|α|≤38 deg. Accordingly, there is the advantage that the belt angles α of the belt plies 141 to 144 are appropriately adjusted.

Further, the pneumatic tire 1 further includes the protective layer 147 disposed on the outer side in the tire radial direction of the outermost layer belt ply 144 (refer to FIG. 5). Accordingly, there is the advantage that the belt layer 14 is protected.

[Target of Application]

The pneumatic tire 1 is preferably used for a radial tire for construction vehicles. The radial tire for construction vehicles, which is a tire mounted to a construction vehicle that travels on an uneven ground of, for example, a civil engineering construction site, is mounted to a construction vehicle such as a large dump truck, a tire roller, a scraper, a grader, a crane, or a wheel loader.

However, the present technology is not limited to the above, and the pneumatic tire 1 may be used as a radial tire for heavy loads that is mounted to a truck, a bus, or the like (not illustrated).

EXAMPLES

Figure 7:
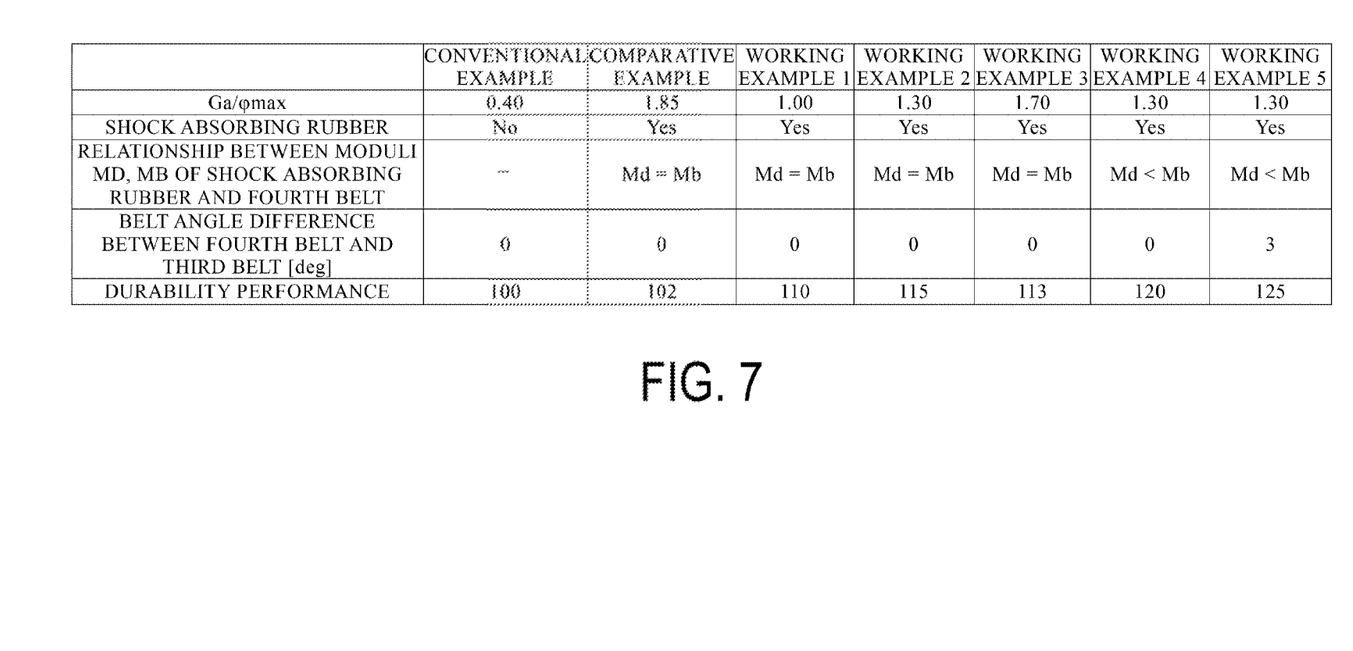
FIG. 7 is a table showing results of performance testing of pneumatic tires according to the embodiment of the present technology.

FIG. 7 is a table showing results of performance testing of pneumatic tires according to the embodiment of the present technology.

In these performance tests, evaluation was carried out on a plurality of different test tires for durability performance. The test tires having a tire size of 3300R51 E*2 were each assembled on a TRA specified rim, and a TRA specified air pressure and TRA specified load were applied to the test tires. Further, the test tires were mounted on all wheels of a dump truck test vehicle having a maximum loading capacity of 150 t.

In the evaluation of durability performance, after the test vehicle had traveled 7000 h at an average speed of 15 km/h on a predetermined off-road course, the test tires were disassembled and examined for the separation that occurred between the outermost layer belt ply and the adjacent belt ply. Then, evaluations were performed by indexing the examination results with the conventional example as the standard score (100). In these evaluations, higher scores are preferable, and a score of 110 or greater is considered as having a sufficiently superior effect.

The test tire from Working Example 1 had the structure illustrated in FIGS. 1 to 4. Further, the belt angle of the first belt 141 was 22 deg, the belt angle of the second belt 142 was 24 deg, the belt angle α3 of the third belt 143 was 22 deg, and the belt angle α4 of the fourth belt 144 was 18 deg. Further, as illustrated in FIG. 3, the belt plies 141 to 144 were laminated so that the inclination directions (the signs of the belt angles) of the belt cords are horizontally inverted in an alternate manner. Further, the outer diameters φ of the belt cords of each of the belt plies 141 to 144 were all the same, and were 3.8 mm (=φ3=φ4=φmax). The modulus Mb at 100% elongation of the coating rubber 1442 of the outermost layer belt ply 144 was 4.0 MPa, and the breaking elongation E of the belt cord 1441 was 330%.

The test tires from Working Examples 2 through 5 were modified examples of Working Example 1.

In the Conventional Example, the belt layer 14 in the structure illustrated in FIGS. 1 to 4 does not include the shock absorbing rubber 146. For this reason, the ratio Ga/φmax is small.

As shown in the test results, it can be seen that the durability performance is improved in the test tires of the Working Examples 1 to 5.

What is claimed is:

1. A pneumatic tire comprising:
   a pair of bead cores;
   a carcass layer extending between the pair of bead cores; and
   a belt layer including a laminate of at least four belt plies having steel belt cords covered with coating rubber, the belt layer being disposed on an outer side in a tire radial direction of the carcass layer;
   when the belt ply disposed on an outermost side in the tire radial direction is designated as an outermost layer belt ply and the belt ply disposed on an inner side in the tire radial direction of the outermost layer belt ply is designated as an adjacent belt ply,
   an inter-cord distance Ga between the outermost layer belt ply and the adjacent belt ply having a relationship such that $1.30 \leq Ga/\varphi max \leq 1.80$ with respect to a maximum value φmax of outer diameters of the belt cords in the outermost layer belt ply and the adjacent belt ply,
   an inter-cord distance Ga' between other adjacent belt plies, and a maximum value φmax' of outer diameters of the belt cords in the other adjacent belt plies being defined, and Ga'/φmax' being less than Ga/φmax,
   the maximum value φmax of the outer diameters of the belt cords being in a range of $1.50 \text{ mm} \leq \varphi max \leq 6.00 \text{ mm}$,
   a breaking elongation E of the belt cords of the outermost layer belt ply being in a range of $270\% \leq E \leq 410\%$,
   the outermost layer belt ply and the adjacent belt ply have belt angles having mutually different signs, and
   an absolute value of the belt angles α of all of the belt plies being in a range of $16 \text{ deg} \leq |\alpha| \leq 28 \text{ deg}$.

2. The pneumatic tire according to claim 1, wherein a modulus Mb at 100% elongation of the coating rubber of the outermost layer belt ply is in a range of $3.0 \text{ MPa} \leq Mb \leq 4.5 \text{ MPa}$.

3. The pneumatic tire according to claim 1, wherein a belt angle of the outermost layer belt ply among belt angles of all of the belt plies is solely smallest.

4. The pneumatic tire according to claim 3, wherein the belt angle, as an absolute value, of the outermost layer belt ply is not less than 16 deg and not greater than 20 deg.

5. The pneumatic tire according to claim 1, further comprising a shock absorbing rubber that is disposed between the outermost layer belt ply and the adjacent belt ply and adjusts an inter-cord distance Ga.

6. The pneumatic tire according to claim 5, wherein a modulus Md at 100% elongation of the shock absorbing rubber has a relationship such that Md<Mb with respect to a modulus Mb at 100% elongation of the coating rubber of the outermost layer belt ply.

7. The pneumatic tire according to claim 5, wherein a gauge Ga' of the shock absorbing rubber has a relationship such that $0.45 \leq Ga'/\varphi max \leq 1.00$ with respect to the maximum value φmax of the outer diameters of the belt cords in the outermost layer belt ply and the adjacent belt ply.

8. The pneumatic tire according to claim 1, wherein a difference between absolute values of a belt angle of the outermost layer belt ply and a belt angle of the adjacent belt ply is not less than 3 deg.

9. The pneumatic tire according to claim 1, further comprising a protective layer disposed on an outer side in the tire radial direction of the outermost layer belt ply.

10. The pneumatic tire according to claim 1, wherein a radial tire for construction vehicles is a target of application.

11. The pneumatic tire according to claim 1, wherein the carcass layer is constituted by a plurality of carcass cords formed of steel and covered by coating rubber.

12. The pneumatic tire according to claim 1, wherein:
    the belt plies include a first belt, a second belt and a third belt in order from an inner side in the tire radial direction, and
    the pneumatic tire further comprises belt edge cushions respectively inserted between edge portions of the first belt and the second belt, and edge portions of the third belt and the second belt;
    a modulus Mc of the belt edge cushion having a relationship such that Mc<Mb with respect to a modulus Mb of a coating rubber of the adjacent belt ply.

13. The pneumatic tire according to claim 1, wherein Ga'/φmax' is within a range of from not less than 0.3 to not greater than 0.7.

14. The pneumatic tire according to claim 1, wherein each of the at least four belt plies has a belt angle having mutually different signs with respect to adjacent belt plies.

15. A pneumatic tire comprising:
    a pair of bead cores;
    a carcass layer extending between the pair of bead cores; and
    a belt layer including a laminate of at least four belt plies having steel belt cords covered with coating rubber, the belt layer being disposed on an outer side in a tire radial direction of the carcass layer;
    when the belt ply disposed on an outermost side in the tire radial direction is designated as an outermost layer belt ply and the belt ply disposed on an inner side in the tire radial direction of the outermost layer belt ply is designated as an adjacent belt ply,
    an inter-cord distance Ga between the outermost layer belt ply and the adjacent belt ply having a relationship such that $0.80 \leq Ga/\varphi max \leq 1.80$ with respect to a maximum value φmax of outer diameters of the belt cords in the outermost layer belt ply and the adjacent belt ply,
    an inter-cord distance Ga' between other adjacent belt plies, and a maximum value φmax' of outer diameters of the belt cords in the other adjacent belt plies being defined, and Ga'/φmax' being less than Ga/φmax,
    a breaking elongation E of the belt cords of the outermost layer belt ply being in a range of $270\% \leq E \leq 410\%$,
    the outermost layer belt ply and the adjacent belt ply have belt angles having mutually different signs, and
    an absolute value of the belt angles α of all of the belt plies being in a range of $16 \text{ deg} \leq |\alpha| \leq 28 \text{ deg}$.

16. The pneumatic tire according to claim 15, wherein Ga'/φmax' is within a range of from not less than 0.3 to not greater than 0.7.

* * * * *